United States Patent [19]

Wyss

[11] Patent Number: 5,018,309
[45] Date of Patent: May 28, 1991

[54] UNIVERSAL GRINDER

[75] Inventor: Peter Wyss, Steffisburg, Switzerland

[73] Assignee: Fritz Studer AG, Switzerland

[21] Appl. No.: 417,454

[22] Filed: Oct. 5, 1989

[51] Int. Cl.[5] .............................................. B24B 25/00
[52] U.S. Cl. ......................................... 51/72 R; 51/3;
51/105 R; 51/166 MH; 51/235
[58] Field of Search ............ 51/3, 72 R, 105 R, 131.1,
51/166 TS, 166 MH, 166 R, 34 C, 34 E, 34 G,
216 ND, 235; 269/8

[56] References Cited

U.S. PATENT DOCUMENTS

| 3,253,665 | 5/1966 | Schienle | 51/235 X |
|---|---|---|---|
| 3,893,676 | 7/1975 | Gloshinski et al. | 269/8 |
| 4,497,138 | 2/1985 | Schreiber | 51/3 |
| 4,606,150 | 8/1986 | Grimm | 51/34 C |
| 4,656,789 | 4/1987 | Schwör | 51/105 R |
| 4,829,716 | 5/1989 | Ueda et al. | 51/3 |
| 4,850,146 | 7/1989 | Clough et al. | 51/34 E |
| 4,858,387 | 8/1989 | Clough et al. | 51/34 E |

FOREIGN PATENT DOCUMENTS 1937300 8/1980 Fed. Rep. of Germany .

Primary Examiner—D. S. Meislin
Attorney, Agent, or Firm—Evenson, Wands, Edwards, Lenahan & McKeown

[57] ABSTRACT

In the case of a universal grinding machine, it is provided that a workpiece spindle head, a grinding spindle head and a footstock are each constructed as separate constructional units which, by means of fixing devices, are fixed to the base, these fixing devices permitting a detaching and a changing of the relative working position and a reattaching in the new working positions.

15 Claims, 3 Drawing Sheets

UNIVERSAL GRINDER

BACKGROUND AND SUMMARY OF THE INVENTION

The invention relates to a universal grinder having a bed on which a workpiece spindle head, a grinding spindle head and a footstock are arranged.

Universal grinders of the initially mentioned type are used for machining round surfaces on the interior side or exterior side of workpieces as well as for machining plane surfaces on workpieces. They are produced in very different sizes for the manufacturing of individual parts as well as for the manufacturing of large series of workpieces. The grinding operations on the corresponding workpieces are carried out by means of an abrasive disk or abrasive belt. Since workpieces occur in practice which vary considerably in their dimensions and, for example, in their length and in the diameter may deviate at a ratio of more than 1:100, very different universal grinders must be created. This is necessary also because the ratio of the length to the diameter may also vary to an extreme extent; i.e., in one case, long and thin workpieces, and in the next case, short plate-shaped workpieces may have to be machined. In this situation, it is customary during the machining of workpiece having a great length, such as a marine propeller shaft, to design the universal grinder such that the rotating axis of the workpiece extends horizontally, in which case, the mounting lengths of the workpiece may measure up to several meters. Disk-shaped and plate-shaped workpieces may be aligned and gripped more easily if the workpiece can be placed and mounted on a horizontal table which rotates around a vertical shaft. Because of the large number of the different workpieces to be machined, a large number of different types of universal grinders is obtained. This results in considerable investments for shops, particularly for repair shops which must carry out very different work on very different workpieces and machine only a relatively small number of these workpieces at a time.

In order to carry out the machining of differently shaped workpieces by means of a convertible machine, it is known (DE-AS 19 37 300) to assemble the substructure of this machine of several box-shaped base elements which, mutually exchangeably, can be connected with one another in different forms by means of detachable connections.

An object of the invention is to provide a universal grinder of the initially mentioned type which is adaptable over wide ranges to the dimensions of very different workpieces, while optimal working conditions are maintained.

This object is achieved in that the workpiece spindle head, the grinding spindle head and the footstock are each constructed as separate constructional units which are fixed to the substructure by means of fixing devices which permit a detaching and a changing of the relative working positions and a reattaching in the new working positions.

By means of this construction, in which the constructional units are connected only by means of mechanical, electrical or hydraulic control transmitting devices, a change-over to another workpiece can be carried out within a very short period of time. This type of a universal grinder is particularly suitable for a repair shop in which workpieces must be machined which have very different dimensions, in each case only one or only a few workpieces having to be machined.

In a further development of the invention, it is provided that the bed is constructed as a plate having a plane top surface on which the constructional units can be displaced and gripped. As a result, it becomes possible in a very simple manner to precisely align the individual constructional units with respect to one another since the plane top surface of the plate may be used as a reference plane.

In order to facilitate the aligning of the constructional units in certain preferred embodiments, it is provided that the constructional units are equipped with identification generators which are mounted at respectively defined points and can be recognized by an adjusting device.

A simple and secure gripping of the constructional units at the bed is obtained in that, in a further development of preferred embodiments of the invention, the constructional units are each equipped with an electromagnetic gripping device which braces them with respect to the bed.

In order to facilitate the displacing of the constructional units, it is provided in a further development of preferred embodiments of the invention that the constructional units are each equipped with a lift-off device which permits a detaching from the bed. This lift-off device may also be connected with a sliding device or other device which reduces the displacing resistance of the constructional units.

In a further development of preferred embodiments of the invention, devices are provided for storing the relative working positions of at least the workpiece spindle head and the grinding spindle head which are suitable for the machining of certain workpieces. As a result, it becomes possible to very easily retrieve the working positions which had already been taken up once for the machining of a corresponding workpiece.

In a further development of preferred embodiments of the invention, it is provided that the workpiece spindle head and/or the grinding spindle head are each provided with a mounting surface which extends transversely to the spindle shaft and a mounting surface which extends parallel to the spindle shaft for the mounting on the bed. As a result, the workpiece spindle head and/or the grinding spindle head can be arranged in different positions on the bed, for example, with a vertical spindle shaft or a horizontal shaft so that an adaptation is possible also in this respect to the type of workpiece to be machined.

For the same purpose, it is provided in another development of the invention that at least two different types of workpiece spindle heads and/or grinding spindle heads are provided. The most suitable constructional unit for that particular application may then be used in each case.

In a further embodiment of the invention, it is provided that the workpiece spindle head and/or the grinding spindle head and/or the footstock each have a bottom part, which can be mounted on the bed, and a top part, which is adjustable with respect to the bottom part. In this embodiment, it is possible to carry out a relatively rough adjusting of the new working positions by connecting the bottom parts with the bed, while the precise adjusting will then take place by the relative adjustment of the respective top parts with respect to the bottom parts.

DETAILED DESCRIPTION OF THE DRAWINGS

Figure 1:
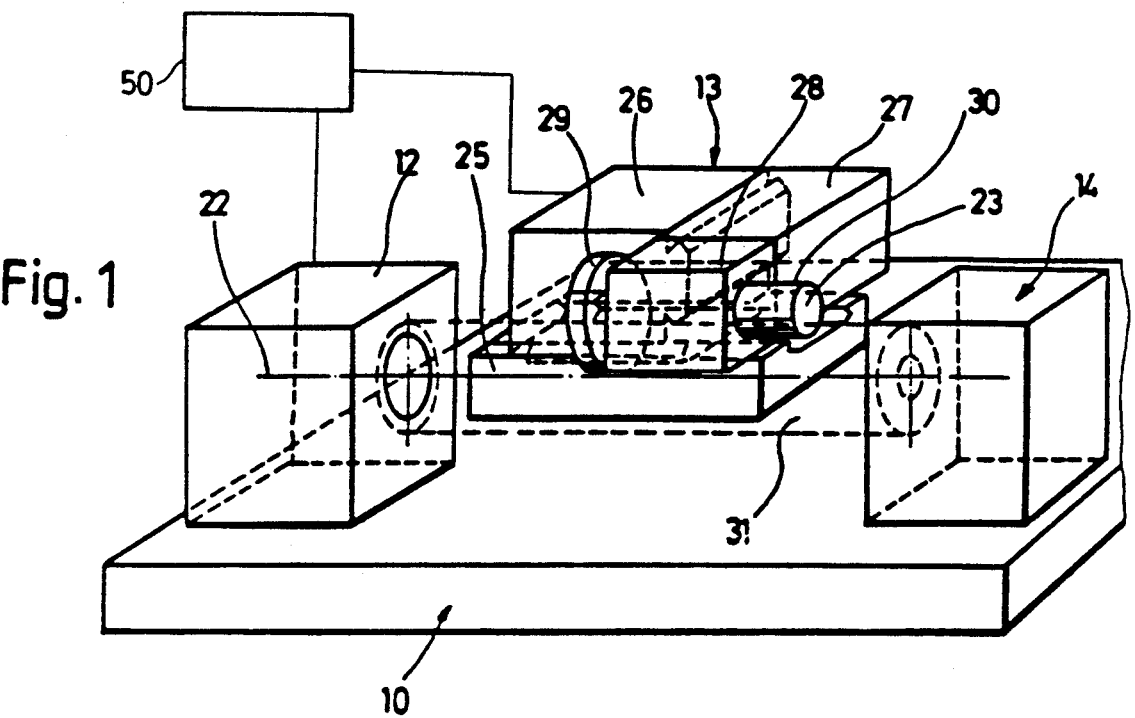
FIG. 1 is a perspective view of a universal grinder with an adjustment for the cylindrical surface grinding of an undulated workpiece constructed according to a preferred embodiment of the invention.

The universal grinder shown in FIG. 1 has a workpiece spindle head 12, a grinding spindle head 13 and a footstock 14 which are each constructed as an independent constructional unit and which, by way of a plane mounting surface, stand on the plane top surface of a bed plate 10. As will be explained later by means of FIG. 6, the constructional units 12, 13, 14 grip onto the base plate 10 by means of a magnetic gripping device. The constructional units 12, 13, 14 are each shown only schematically. The workpiece spindle head 12 has a conventional construction and contains a clamping chuck for a workpiece which is equipped with a rotary drive. The grinding spindle head 13 also has a conventional construction. It has a Z-axis-type bottom part 25 which is mounted on the base plate 10. A carriage 26 is situated on it which can be adjusted in longitudinal direction of the Z-axis-type bottom part 25 and on which a carriage 27 is mounted which can be adjusted transversely to it. Carriage 27 carries the actual grinding head 28 which is rotatable preferably around a horizontal axis and contains the grinding wheel 29 with the drive 30. The footstock 14 also has a conventional construction and contains particularly a clamping chuck for the workpiece. In the embodiment according to FIG. 1, an undulated workpiece 31, which is only outlined, is ground on its exterior side, specifically only over a relative short area of its length. In this case, only a relatively short Z-axis-type bottom part 25 is provided which is positioned at the site of the grinding point.

A device 50 is coupled to at least the grinding spindle head and workpiece spindle head for storing the relative positions of the constructional units which are suitable for the machining of certain workpieces. The storage devices make it easy to retrieve previously used working positions for machining the same type of workpiece.

Figure 2:
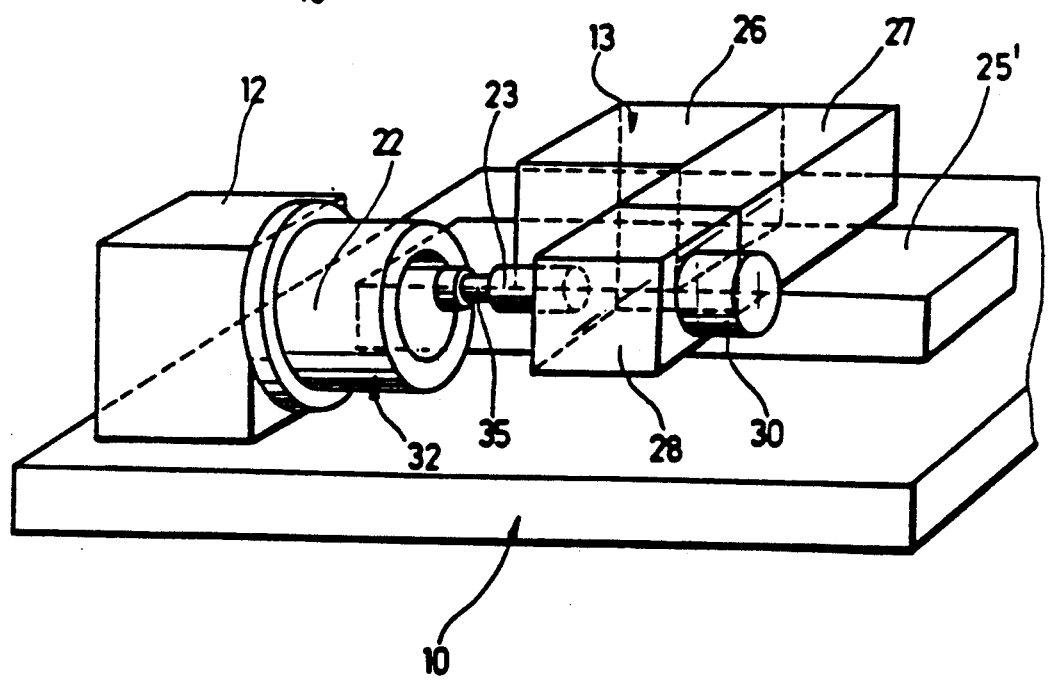
FIG. 2 is a perspective view of the universal grinder according to FIG. 1 shown with an adjustment for the internal circular grinding of a drum-type workpiece.

In the embodiment according to FIG. 2, a drum-shaped workpiece 32, which is being ground cylindrically on the inside, is chucked in the workpiece spindle head 12. The grinding head 28 of the grinding spindle head 13 is correspondingly equipped with an internal grinding tool 23. In the embodiment according to FIG. 2, a relatively long Z-axis-type bottom part 25' is provided so that a correspondingly long workpiece length can be ground.

Figure 3:
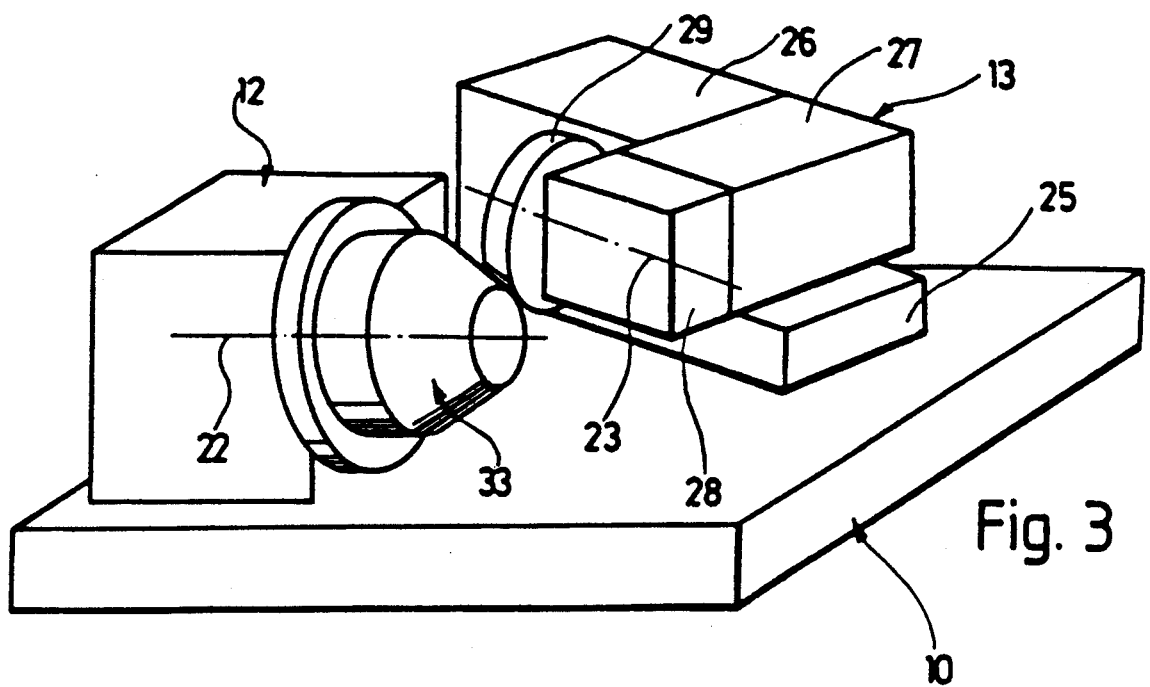
FIG. 3 is a perspective view depicting an adjustment of the universal grinder for the external conical grinding of a workpiece.

In the embodiment according to FIG. 3, a workpiece 33 is chucked into the workpiece spindle head 12 and has an exterior surface which is to be ground conical. The grinding spindle head 13, on the bed plate 10, is correspondingly aligned into a working position and fixed in this working position. In this working position, the grinding wheel is arranged at a corresponding angle, i.e., the displacing direction of the carriage 26 on the Z-axis-type bottom part 25.

In the embodiments according to FIG. 1 to 3, the grinding spindle head 13 and the workpiece spindle head 12 were always arranged such that the corresponding spindle shafts 23, 22 extend horizontally. However, for the machining of flat disk-shaped workpieces, for example, the workpiece 34 shown in FIG. 4, an arrangement with a vertical spindle shaft 22 of the workpiece spindle head 12' is more advantageous.

Figure 4:
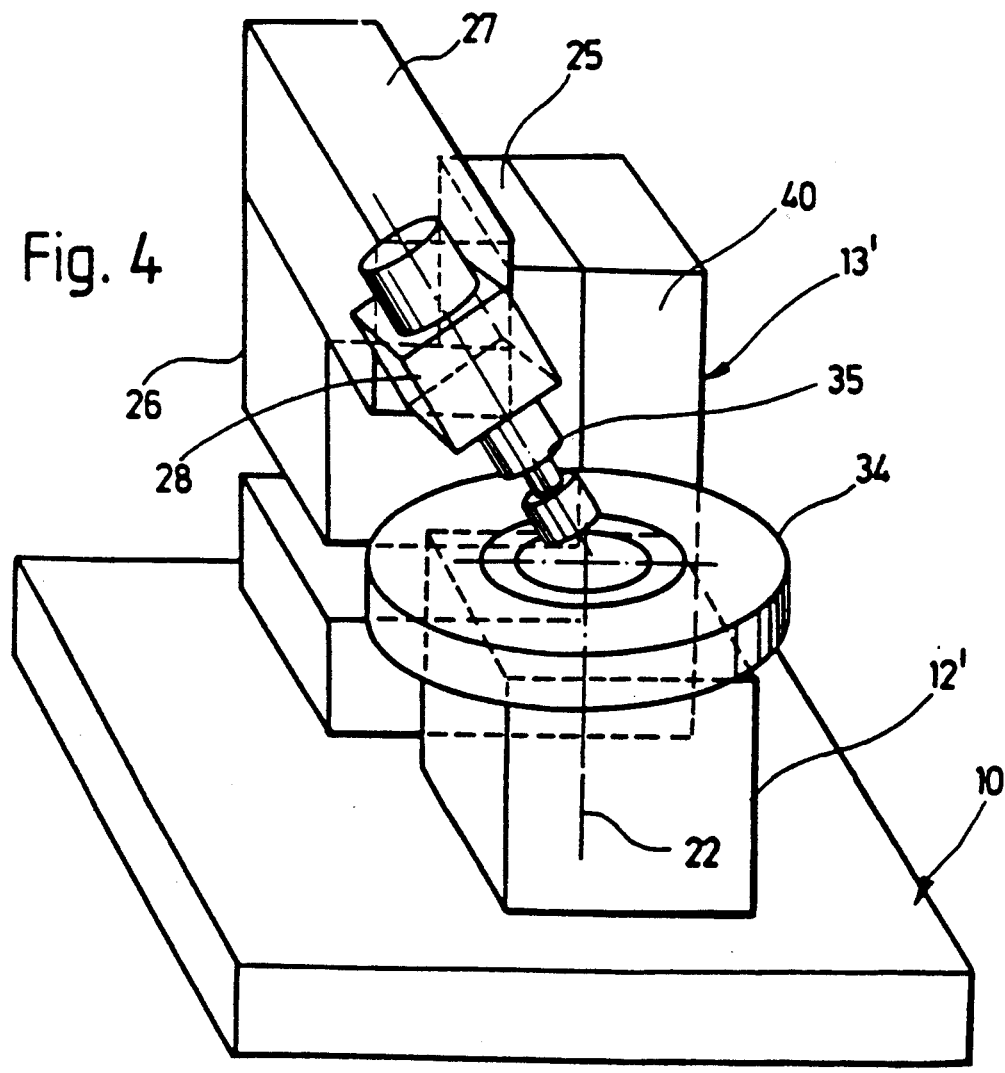
FIG. 4 is a modification of the universal grinder with an adjustment for the grinding of a disk-shaped workpiece.

In the embodiment according to FIG. 4, a workpiece spindle head 12' is therefore provided, the spindle shaft 22 of which is aligned vertically. Naturally, it may also be provided that the same workpiece spindle head 12 is used which correspondingly has two mounting surfaces by means of which it can be mounted on the base plate 10.

The grinding spindle head 13' according to FIG. 4 has a mounting angle 40 on which the grinding spindle head is arranged according to FIG. 1 or 2, i.e., a grinding spindle head 13 with a short Z-axis-type bottom part 25. As a modification of the shown embodiment, it may also be provided that the Z-axis-type bottom part 25 itself is constructed as an angle which has two mounting surfaces. In the embodiment according to FIG. 4, the grinding head 28 with the internal grinding tool 35 is also swivelled, so that a conical internal grinding is possible.

Figure 5:
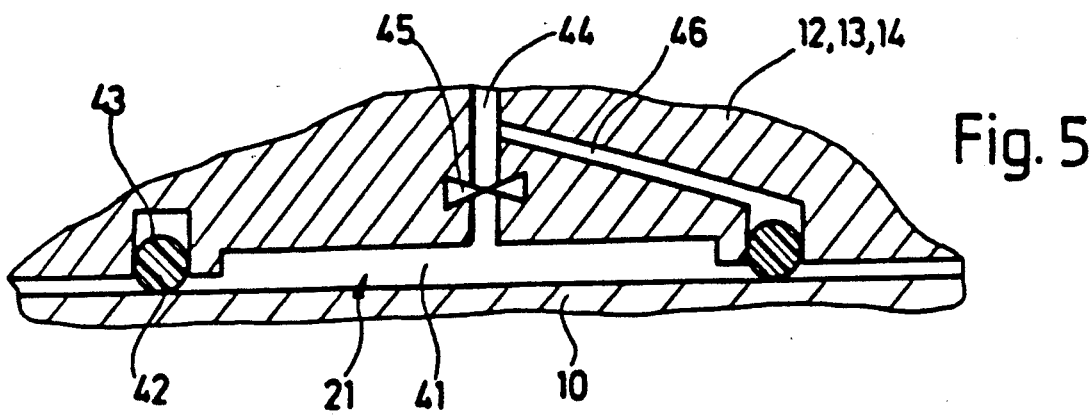
FIG. 5 is an enlarged sectional view of a mounting surface of one of the constructional units and of the plane surface of a bed with a lift-off device for the universal grinder of FIGS. 1-4.

In order to be able to relatively easily displace the constructional units which each have a plane mounting surface by means of which they are mounted on the plane top side of the base plate 10, a lift-off device 21 is provided corresponding to FIG. 5. In the mounting surface of the constructional units 12, 13, 14, a recess 41 is provided which is bordered by a surrounding sealing profile 42 which is disposed in a surrounding groove 43. The recess 41, by way of a compressed-air duct 44 containing a screen 45, is connected to a compressed-air source which supplies the recess 41 with compressed air so that it acts as a bearing chamber. By way of the ducts 46, which branch off the duct 44, the surrounding groove 43 is also supplied with compressed air. Thus, an aerostatic lift-off system is provided by means of which the constructional parts 12, 13, 14 can be lifted off the base plate 10, so that this base plate 10 can be displaced relatively easily.

Figure 6:
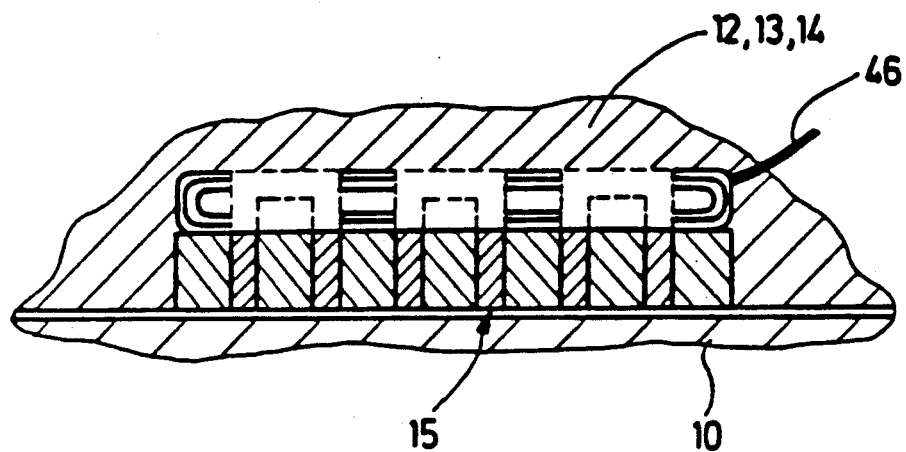
FIG. 6 is a further sectional view of the area of the mounting surface of a constructional unit and the plane surface of the bed with an electromagnetic gripping device for the universal grinder of FIGS. 1-5.

In FIG. 6, a magnetic gripping device 15 is shown which is arranged in the mounting surface of the constructional units 12, 13, 14 and is supplied with current by way of a line 46. In order to obtain increased adhesive force also on a relatively roughly machined base, an alternating pole division of the active magnetic body is advantageous. The magnetic gripping device 15 may surround, for example, the lift-off device 21 in a ring-shaped manner. Inversely, it is also contemplated to provide a lift-off device 21 which extends around the magnetic gripping device 15.

Figure 7:
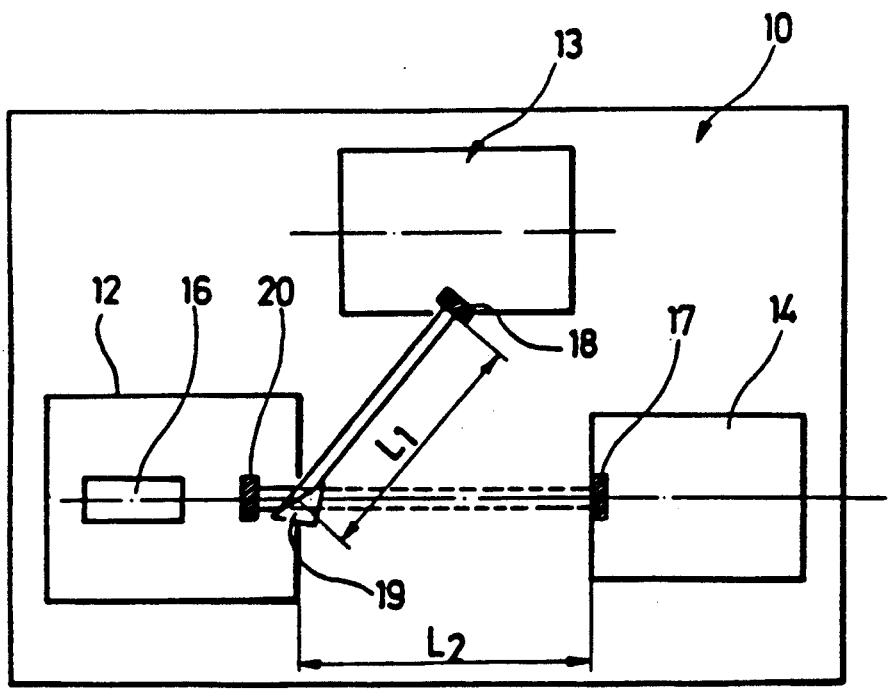
FIG. 7 is a top view of a schematically shown universal grinder according to the invention with a basic diagram of an adjusting device.

In FIG. 7, an embodiment of an adjusting system is shown and explained by means of which the constructional units 12, 13, 14 can be positioned such that they are aligned precisely with respect to one another. In the workpiece spindle head 12, which is fixed on the base plate 10, a dual-frequency laser interferometer 16 is fixedly installed which is aligned in the spindle shaft. The dual-frequency laser interferometer 16 generates a laser beam which is emitted as a double-beam/split beam by an angle interferometer 20. This double-beam extends in alignment with respect to the spindle shaft of the workpiece spindle head 12. The footstock 14 is equipped with a prism reflector 17 which, as an identification generator, is arranged at a precisely defined point of the footstock 14, particularly in alignment with the shaft of the clamping chuck. The laser beam is reflected by the prism reflector so that the distance (L2) between the prism reflector 17 and the angle interferometer 20 as well as any deviation from the alignment is measured and indicated.

For the positioning of the grinding spindle head 13 in relation to the workpiece spindle head 12, a prism reflector 19 is placed on a graduated disk connected behind the angle interferometer 20. The graduated disk is provided with an angle marking so that the two-beam laser beam experiences a defined adjustable angular deflection. Behind the grinding spindle head 13, a prism reflector 18 is arranged in a predetermined defined point, is also arranged on a graduated disk and is adjusted to a corresponding angle. Thus, it is relatively easy to adjust and position also the grinding spindle head 13 precisely with respect to the workpiece spindle.

What is claimed:

1. A universal grinder, comprising:
   a common machine bed having a planar top surface on which a workpiece spindle head, a grinding spindle head and a footstock are selectively arranged, wherein said workpiece spindle head, the grinding spindle head and the footstock are each constructed as independently operable separate constructional units freely movable to an infinite number of reusable working positions on said planar top surface to allow different operating ranges for the universal grinder to machine both small and large workpieces;
   means for fixing said separate constructional units to said planar top surface in any of the reusable working positions to permit detaching and a changing of said constructional units between reusable working positions;
   a precision alignment means for aligning said constructional units at selected working positions;
   means mounted at predetermined locations on each of said separate constructional units for interacting with said precision alignment means for locating said separate constructional units in the reusable working positions on said planar top surface for different operating ranges.

2. A universal grinder according to claim 1, wherein said machine bed is constructed as a plate, on the planar top surface of which the separate constructional units can be selectively displaced and gripped.

3. A universal grinder according to claim 1, wherein the constructional units are each equipped with an electromagnetic gripping device which braces them with respect to the planar top surface, said electromagnetic gripping device being said means for fixing.

4. A universal grinder according to claim 2, wherein the constructional units are each equipped with an electromagnetic gripping device which braces them with respect to the planar top surface, said electromagnetic gripping device being said means for fixing.

5. A universal grinder according to claim 1, wherein at least one constructional unit has a means for lifting providing a pressure medium between the top side of the planar top surface and the constructional unit to permit a detachment from the planar top surface whereby the pressure medium allows the sliding of the constructional unit to any of the reusable working positions, said means for lifting being a part of said means for fixing.

6. A universal grinder according to claim 3, wherein at least one constructional unit has a means for lifting providing a pressure medium between the top side of the planar top surface and the constructional unit to permit a detachment from the planar top surface whereby the pressure medium allows the sliding of the constructional unit to any of the reusable working positions.

7. A universal grinder according to claim 1, wherein means are provided for storing relative working positions of at least the workpiece spindle head and the grinding spindle head which are suitable for the grinding of certain workpieces.

8. A universal grinder according to claim 5, wherein means are provided for storing relative working positions of at least the workpiece spindle head and the grinding spindle head which are suitable for the grinding of certain workpieces.

9. A universal grinder according to claim 1, wherein at least one of the workpiece spindle head and the grinding spindle head is provided with a mounting surface extending transversely to a spindle shaft thereof and with a mounting surface extending in parallel to the spindle shaft for selective mounting on the planar top surface.

10. A universal grinder according to claim 3, wherein at least one of the workpiece spindle head and the grinding spindle head is provided with a mounting surface extending transversely to a spindle shaft thereof and with a mounting surface extending in parallel to the spindle shaft for selective mounting on the planar top surface.

11. A universal grinder according to claim 1, wherein a second different type of a workpiece spindle head is provided.

12. A universal grinder according to claim 1, wherein at least one of the workpiece spindle head, the grinding spindle head and the footstock includes a bottom part and a top part coupled to the bottom part, said bottom part being mounted on the planar top surface wherein the top part can be adjusted relative to the bottom part.

13. A universal grinder according to claim 11, wherein the constructional units are each equipped with a lift-off device permitting a detachment from the planar top surface.

14. A universal grinder according to claim 12, wherein the constructional units are each equipped with an electromagnetic gripping device which braces them with respect to the planar top surface, said electromagnetic gripping device being said means for fixing.

15. A universal grinder according to claim 3, wherein a second different type of the grinding spindle head is provided.

* * * * *